3,796,727
SYNTHESIS OF NOVEL BENZOPYRAN
COMPOUNDS
Charles D. Deboer, Rochester, N.Y., assignor to Eastman Kodak Company, Rochester, N.Y.
No Drawing. Filed Jan. 31, 1972, Ser. No. 222,272
Int. Cl. C07d 7/26
U.S. Cl. 260—345.2      13 Claims

ABSTRACT OF THE DISCLOSURE

Novel 2H-3-substituted-5,6-benzopyrans and processes for their preparation are disclosed. Vinyl ketone compounds are reacted under basic conditions with o-hydroxybenzaldehydes to form the novel benzopyran compounds. The compounds can be used to prepare light-sensitive polymers useful in photosensitive elements and processes.

---

This invention relates to novel polycyclic heterocyclic compounds and to processes for their preparation.

An object of this invention is to provide a novel class of polycyclic heterocyclic compounds.

Another object of this invention is to provide processes for the production of novel benzopyran compounds.

Still another object of this invention is the production of a novel class of compounds that can be used as intermediates to form other organic chemicals.

Still additional objects will become apparent from a consideration of the following specification and the appended claims.

These and other objects are accomplished according to the present invention by the reaction of o-hydroxybenzaldehydes under basic conditions with selected vinyl ketone compounds to form novel benzopyran compounds having the following general formula:

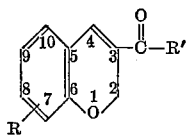

wherein R is hydrogen, an alkyl, alkoxy, halogen or an aryl or substituted aryl group wherein the alkyl group and the alkyl portion of the alkoxy group have from 1–8 carbon atoms, such as methyl, ethyl, propyl, etc. and the aryl or substituted aryl has from 6–20 carbon atoms such as phenyl, naphthyl, toluene, etc., and R' is hydrogen, an alkyl group of 1–30 carbon atoms and preferably 1–10 carbon atoms such as methyl, ethyl, propyl, etc., or phenyl or a substituted phenyl group such as naphthyl, toluene, etc.

As hereinbefore set forth the novel benzopyrans may be prepared according to the following equation:

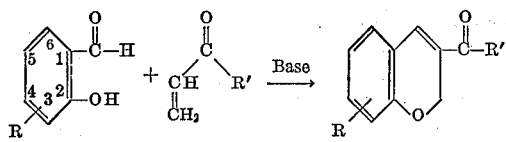

in which R and R' are as defined above.

Examples of o-hydroxybenzaldehydes which may be used include o-hydroxybenzaldehyde (salicylaldehyde), 3-methylsalicylaldehyde, 3-ethylsalicylaldehyde, 4-methylsalicylaldehyde, 3-octylsalicylaldehyde, 5-ethylsalicylaldehyde, 6-methylsalicylaldehyde, 6 - ethylsalicylaldehyde, etc., 3-chlorosalicylaldehyde, 4-bromosalicylaldehyde, 5-chlorosalicylaldehyde, etc., 3-phenylsalicylaldehyde, 4-phenylsalicylaldehyde, 5-naphthylsalicylaldehyde, 6-toluenesalicylaldehyde, etc., 3-methoxysalicylaldehyde, 4-methoxysalicylaldehyde, 5 - methoxysalicylaldehyde, 6-methoxysalicylaldehyde, 3-ethoxysalicylaldehyde, 4-ethoxysalicylaldehyde, 5-ethoxysalicylaldehyde, 6-ethoxysalicylaldehyde, 3 - propoxysalicylaldehyde, 4-propoxysalicylaldehyde, 5-propoxysalicylaldehyde, 6-propoxysalicylaldehyde, etc.

Examples of the vinyl ketone compounds which may be used comprise alkyl vinyl ketones where the alkyl portion has from 1–30 carbon atoms and preferably 1–10 carbon atoms such as methyl vinyl ketone, ethyl vinyl ketone, etc., phenyl vinyl ketone, substituted phenyl vinyl ketones such as toluene vinyl ketone, naphthyl vinyl ketone, etc., and acrolein.

The process, according to this invention, may advantageously be conducted under conditions of temperature, time, and relative proportions of the reactants which favor appreciable addition of the reactants to form a compound of the herein defined class. The reactants may be employed in various proportions relative to one another, a suitable range of proportions comprising mole ratios of the two reactants of from about 1:10 to about 10:1, a preferred range being from about 2:1 to about 1:2. The temperature that is employed should be about 10° C.–90° C. and preferably about 15° C.–40° C. The temperature should not be so high that undesired side reactions, decomposition reactions or polymerization reactions occur. Pressures of about atmospheric generally are most convenient although superatmospheric as well as subatmospheric pressures may also be used. The inert gasses that may be used in the reaction include nitrogen, methane, argon or the like.

The o-hydroxybenzaldehydes may advantageously be dissolved in an aqueous solution or an alcohol-water solution that is made basic by the addition of a water soluble base. Suitable bases useful according to this invention, include potassium hydroxide, sodium hydroxide, sodium carbonate, trimethylammonium hydroxide and the like. The o-hydroxybenzaldehydes, when dissolved in the basic solution, neutralize the solution and the corresponding salt is formed. The salt thus formed can then react with the vinyl ketone to form the benzopyrans according to this invention. When the benzopyran is formed the base is regenerated. Thus only a catalytic amount of base need be used to accomplish the reaction. However, if too small an amount of base is used, the rate of the reaction may be slow. The mole ratio of base to o-hydroxybenzaldehyde may be from 1:1000 to 10:1 with a preferred range being from 1:50 to 1:5.

A specific embodiment of this invention resides in a process for the preparation of 2H-3-substituted-5,6-benzopyran compounds by passing a stream of an inert gas through the vinyl ketone and then into a basic aqueous or basic alcohol-water solution of the o-hydroxybenzaldehyde. The reaction is conveniently carried out at or about a temperature of 15°–40° C. until essentially all of the vinyl ketone is bubbled into the o-hydroxybenzaldehyde. After standing at room temperature for a short time a seed crystal of the product may be formed by scratching the reaction vessel and then the 2H-3-substituted-5,6-benzopyran precipitates in nearly quantitative yields. The benzopyran product so obtained may then be recovered and purified by vacuum distillation. The reaction may also be effected at varying temperatures, said temperature depending upon the particular reactants chosen as well as the basic medium used and will usually take place in the aforementioned temperature range of from about 10° C.–90° C.

Another embodiment of this invention resides in a process for the preparation of 2H-3-substituted-5,6-benzopyran compounds wherein the vinyl ketone is added slowly by pouring or dripping a basic solution of a o- hydroxybenzaldehyde at or about a temperature of 15°–40° C. After standing a few minutes the benzopyran product can be precipitated by scratching the vessel to initiate the precipitation.

Examples of the novel 2H - 3 - substituted-5,6-benzopyrans that can be prepared according to the process of this invention include the following:

2H-3-acetyl-5,6-benzopyran,
2H-3-carboxaldehyde-5,6-benzopyran,
2H-3-benzoyl-5,6-benzopyran,
2H-3-naphthoyl-5,6-benzopyran,
2H-3-carboxaldehyde-5,6-(8-chloro)benzopyran,
2H-3-carboxaldehyde-5,6-(9-bromo)benzopyran,
2H-3-benzoyl-5,6-(8-methyl)benzopyran,
2H-3-benzoyl-5,6-(9-methoxy)benzopyran, etc.

The benzopyrans prepared according to this invention are intermediates for preparing photographically useful materials. Light sensitive polymers can be prepared that are useful in photosensitive elements and processes such as those described in my copending U.S. patent application Ser. No. 203,427, filed Nov. 30, 1971 entitled "Light Sensitive Polymer," which is a continuation-in-part application of Ser. No. 831,242, filed June 6, 1969, and Ser. No. 168,342 filed Aug. 2, 1971, now abandoned.

The compounds of this invention may also be used as intermediates in the preparation of color couplers. The compounds are also useful to prepare dyes such as textile dyes.

The present invention will be best understood from the following illustrative examples:

EXAMPLE 1

Salicylaldehyde (122 g.), 1000 ml. of water and 8 g. sodium hydroxide are stirred in a flask at room temperature. A stream of nitrogen is bubbled through a flask containing 70 g. of methyl vinyl ketone and then passed into the salicylaldehyde-water suspension. After all the methyl vinyl ketone is evaporated into the salicylaldehyde solution, a seed crystal of 2H-3-acetyl-5,6-benzopyran is formed by scratching the flask. Within a few minutes the product 2H-3-acetyl-5,6-benzopyran crystallizes and is filtered off, washed with water and then vacuum distilled to give a yellow liquid (B.P. 110° C. under mechanical oil pump vacuum) which solidifies to pale yellow crystals upon standing (M.P. 50–53° C.). The product 2H-3-acetyl-5,6-benzopyran can be kept at room temperature in brown bottles for indefinite periods.

EXAMPLE 2

Salicylaldehyde (122 g.), 1000 ml. of water and 8 g. of sodium hydroxide is stirred at room temperature in a 2000 ml. flask while 65 g. acrolein is bubbled at 30° C., into the solution on a nitrogen stream (by evaporation). Then a seed crystal of the product is formed by scratching the flask, the product is collected by filtration, washed with water, and then vacuum distilled. The product, 2H-3-carboxaldehyde-5,6-benzopyran, must be stored in sealed bottles in the cold or it is slowly oxidized by air to the acid along with some dark orange products.

EXAMPLE 3

Salicyaldehyde (122 g.), 1000 ml. 50–50 ethanol-water and 8 g. of sodium hydroxide are stirred while 132 g. phenyl vinyl ketone in 400 ml. ethanol is slowly dripped into a 2000 ml. vessel at a temperature of 25° C. Then a seed crystal is formed and when the product, 2H-3-benzoyl-5,6-benzopyran, has crystallized it is collected and recrystallized from methanol (M.P. 60–61° C.).

EXAMPLE 4

15 g. of 5-chlorosalicyaldehyde is stirred with 4 grams of sodium hydroxide in 100 ml. of water in a 1000 ml. flask. 7 grams of methyl vinyl ketone in 25 ml. water is then added dropwise over a 2 hour period. The mixture is then stirred one hour more and then extracted with ether, the ether layer dried with sodium sulfate and evaporated to give 2H-9-chloro-3-acetyl-5,6-benzopyran, (M.P. 60–20° C.). The product is then purified by recrystallization from an alcohol-water solution.

EXAMPLE 5

A solution of 15 grams of 3-octylsalicylaldehyde in 30 milliliters of methanol and 10 grams of acrolein is poured into a 1000 ml. reaction beaker containing 3 grams of sodium hydroxide in 10 milliliters of water. After standing 16 hours at room temperature this solution was worked up by adding water, extracting with ether and then drying and evaporating the ether. The residue is distilled under vacuum to give 2 grams of a yellow oil (B.P. 195° C. at 0.5 mm. Hg). The product, 2H-3-octyl-5,6-benzopyran is stable at room temperature and can be stored in dark bottles for an indefinite period of time.

EXAMPLE 6

2H-3-carboxaldehyde-5,6-benzopyran (2.0 g.) and 2.0 g. of acetophenone is suspended in a 100 ml. reaction vessel containing 20 ml. water with 0.5 g. sodium hydroxide. Ethanol is added with stirring until the solution is homogeneous. After standing for about 2 minutes yellow crystals form according to the following reaction:

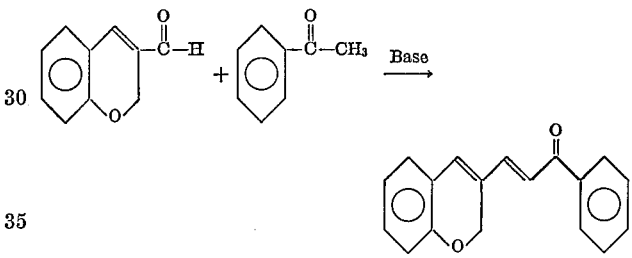

These crystals are then collected and recrystallized from a benzene-hexane solution. The product, 1-benzoyl-2-[3-(2H-5,6-benzopyranyl)]-ethylene, has a M.P. of 150°–151° C. Photolysis of this product in degassed benzene gives a dimer which has the property of developing a fluorescent image when absorbed on silica gel and exposed to 366 nm. radiation.

This invention has been described in detail with particular reference to certain preferred embodiments thereof, but there will be understood that variations and modifications can be effected within the spirit and scope of the invention.

I claim:
1. A compound of the formula:

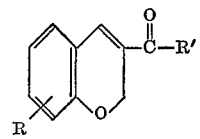

wherein R is hydrogen, an alkyl, alkoxy, halogen or aryl group wherein the alkyl group and the alkyl portion of the alkoxy group have from 1–8 carbon atoms and wherein the aryl is a carbocyclic aryl of 6 to 10 carbon atoms and R' is hydrogen, an alkyl group of 1–30 carbon atoms or phenyl.

2. A compound of the formula:

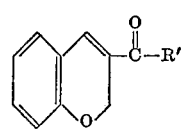

wherein R' is hydrogen, an alkyl group of 1–10 carbon atoms or phenyl.
3. The compound 2H-3-acetyl-5,6-benzopyran.
4. The compound 2H-3-carboxaldehyde-5,6-benzopyran.
5. The compound 2H-3-benzoyl-5,6-benzopyran.

6. A process of preparing 2H-3-substituted-5,6-benzopyrans by reacting in the presence of an inert gas under basic conditions a salicylaldehyde of the formula:

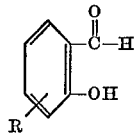

wherein R is a hydrogen, alkyl, alkoxy, halogen or aryl group wherein the alkyl group and the alkyl portion of the alkoxy group has from 1–8 carbon atoms and wherein the aryl is a carbocyclic aryl of 6 to 10 carbon atoms with a vinyl compound of the formula:

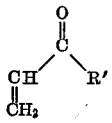

wherein R' is hydrogen, an alkyl group of 1–30 carbon atoms, or phenyl.

7. The process of claim 5 wherein the vinyl compound is methyl vinyl ketone.

8. The process of claim 5 wherein the vinyl compound is acrolein.

9. The process of claim 5 wherein the vinyl compound is phenyl vinyl ketone.

10. A process which comprises reacting salicylaldehyde in the presence of an inert gas under basic conditions with methyl vinyl ketone at a temperature in the range of from about 15–40° C. and recovering the resultant 2H-3-acetyl-5,6-benzopyran.

11. A process which comprises reacting salicylaldehyde in the presence of an inert gas under basic conditions with acrolein at a temperature of from about 15–40° C. and recovering the resultant 2H-3-carboxaldehyde-5,6-benzopyran.

12. A process which comprises reacting salicylaldehyde in the presence of an inert gas under basic conditions with phenyl vinyl ketone at a temperature of from about 15–40° C. and recovering the resultant 2H-3-benzoyl-5,6-benzopyran.

13. A process of preparing a 2H-3-substituted-5,6-benzopyran which comprises passing a stream of an inert gas through a vinyl compound of the formula

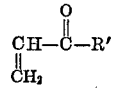

wherein R' is hydrogen, an alkyl group of 1–30 carbon atoms, or phenyl, at a temperature of from about 15–40° C., and then passing said inert gas carrying said vinyl compound into a basic solution of a salicylaldehyde of the formula:

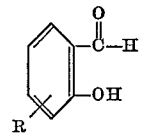

wherein R is hydrogen, an alkyl, alkoxy, halogen or aryl wherein the alkyl group or the alkyl portion of the alkoxy group has from 1–8 carbon atoms and wherein the aryl is a carbocyclic aryl of 6 to 10 carbon atoms at a temperature of from about 15–40° C. until essentially all of the vinyl compound is carried into the salicylaldehyde whereby the benzopyran product is formed and precipitates out of the solution.

References Cited
UNITED STATES PATENTS 3,551,456  12/1970  Bloch _____ 260—345.2
2,987,525   6/1961  Arrigo _____ 260—345.2

JOHN M. FORD, Primary Examiner